Oct. 17, 1939.  C. W. LA PIERRE  2,176,742
APPARATUS RESPONSIVE TO FREQUENCY DIFFERENCE
Filed July 24, 1936
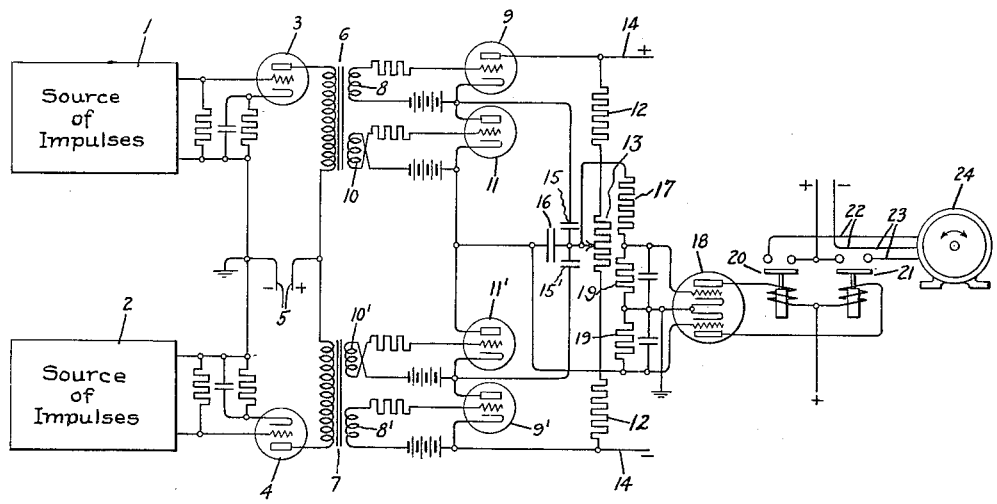
Inventor:
Cramer W. LaPierre,
by Harry E. Dunham
His Attorney.

Patented Oct. 17, 1939

2,176,742

UNITED STATES PATENT OFFICE 2,176,742

APPARATUS RESPONSIVE TO FREQUENCY DIFFERENCE

Cramer W. La Pierre, Schenectady, N. Y., assignor to General Electric Company, a corporation of New York Application July 24, 1936, Serial No. 92,417

6 Claims. (Cl. 177—311)

My invention relates to apparatus for making a response to a difference in the frequency of two series of impulses and the object of my invention is to provide improved apparatus for this purpose which is simple in construction, efficient in operation and inexpensive to manufacture.

My invention will be better understood from the following description taken in connection with the accompanying drawing, and its scope will be pointed out in the appended claims.

In the single figure of the drawing which is a circuit diagram of apparatus embodying my invention, 1 and 2 each represents a source of a series of electrical impulses to the difference in frequency of the impulses of which series the apparatus comprising my invention is responsive. Sources 1 and 2 are shown connected to the input circuits of the electron discharge valves 3 and 4 respectively. The output circuits of these valves are shown supplied by a common source 5 of direct current supply and in series with these output circuits are the primary windings of the transformers 6 and 7. The transformer 6 is provided with the two secondary windings 8 and 10 of which the former controls the grid circuit of the valve 9 and the latter controls the grid circuit of the valve 11. The two windings 8 and 10, however, are reversely connected to the grid circuits of the valves 9 and 11 whereby at the same half cycle, which for convenience will be termed the positive half cycle of the transformer voltage, the grid of the valve 9 is made less negative with respect to its cathode and the grid of the valve 11 is made more negative with respect to its cathode. The grid circuit of each of the valves 9 and 11 is provided with a suitable biasing means such as a battery by which the valves are biased to cut-off; hence the current in the output circuit of each of said valves is negligible when no voltage is received from the windings 8 and 10.

The output circuit of the valve 9 is supplied by one-half of the voltage across the voltage divider comprising the two fixed resistors 12 and the adjustable resistor on potentiometer 13 connected across the source 14 of direct current supply. The output circuit of the valve 9 includes the capacitor 15 which receives a charge whenever the valve 9 is rendered conductive. The output circuit of the valve 11 includes the capacitor 15 and the capacitor 16 in series therewith whereby when this valve is rendered conductive the former capacitor may discharge into the latter capacitor. The capacitance of the capacitor 16 is much greater than that of the capacitor 15, being preferably of the order of ten times greater. At each positive half cycle, therefore, the valve 9 becomes conductive and the capacitor 15 receives a charge. At each following (negative) half cycle the valve 11 becomes conductive and allows the capacitor 15 to discharge into the capacitor 16.

The magnitude and duration of each half cycle or impulse by which the valves 9 and 11 are rendered conducting need be only sufficient to permit the capacitor 15 to become substantially charged to the voltage supplied thereto and to discharge into the capacitor 16 until the charge on each capacitor is substantially the same. Any half cycles or impulses of greater magnitude or duration hence will not materially affect the total charge received by the capacitor 16.

The transformer 7 like the transformer 6 is provided with the two secondary windings 8' and 10' which control the operation of the valves 9' and 11' respectively in the same manner as the corresponding parts described above. In the output circuit of the valve 9' is the capacitor 15' which is like the capacitor 15 and which receives a charge during each half cycle of one polarity of the voltage supplied by the transformer secondary 8'. The valve 11' like the valve 11 permits the capacitor 15' to discharge into the larger capacitor 16 during each half cycle of the opposite polarity. The charges supplied to the capacitor 16 by each of the smaller capacitors 15 and 15' are of opposite polarity; hence they produce charges on the capacitor 16 of opposite polarity. If, therefore, the frequency of the impulses received from the sources 1 and 2 are equal, equal and opposite charges will be supplied from the capacitors 15 and 15' to the capacitor 16 and at the same rate, and the net charge on the latter capacitor, therefore, will be zero. However, if the frequency of the impulses from the source 1 is greater than that from the source 2, then the capacitor 16 will acquire a net charge of one polarity; likewise, if the frequency of the impulses from source 2 is greater than that of the impulses from the source 1, the capacitor 16 will acquire a charge of the opposite polarity.

Various means may be employed for making a response to the resulting polarity of the net charge, if any, on the capacitor 16. The apparatus which I have provided for making such a response may comprise a plurality of similar valves but preferably comprises the single valve 18 shown as having duplicate cathode, grid, and anode elements. It has two input circuits each connected across one of the two equal resistors 19, which resistors connect through the resistor 17 with the opposite sides of the capacitor 16. The two anodes of the valve 18 connect through the windings of the relays 20 and 21 with a suitable source of current which may be direct or alternating and the controlled circuits of these relays serve to close the motor circuits 22 or 23 respectively. The motor 24 may be of any well known and suitable form which is adapted to rotate in one direction or the other in accordance with whether the circuit 22 or the circuit 23 is energized. If, therefore, the resultant charge on the main capacitor 16 is zero, the valve 18 will not pass sufficient current through either of its anode circuits to operate the relay connected therewith. If, however, the main capacitor 16 has a resultant charge of one polarity the valve 18 will pass current through one of its anodes energizing one of the relays to cause the motor to turn in one direction. If the main capacitor has a resultant charge in the opposite sense the valve 18 will pass current through the other anode circuit energizing the other relay to cause the motor to turn in the opposite direction.

By means of the potentiometer 13 suitable correction may be made for circuit variations and for capacitance variations in the capacitors 15 and 15'. Also by the adjustment of this potentiometer the motor 24 may be controlled to respond only when the difference in the frequencies of the two sources departs from a predetermined amount. For example, if it is desired that the output frequency of the source 1 shall normally be a given percentage higher than that of the source 2, the potentiometer 13 would be adjusted so that the motor would operate in the proper direction only in response to a certain small deviation from that difference in the frequencies of the two sources.

The operation of the apparatus will be readily apparent from the above description. If the impulses from the two sources 1 and 2 are equal in frequency the capacitors 15 and 15' will receive equal charges from the source 14 and will deliver equal and opposite charges to the capacitor 16 whereby the resultant charge on the capacitor 16 will be zero. If the frequency of the impulses from the source 1 is greater than the frequency of the impulses from the source 2, the capacitor 16 will have a resultant charge of one polarity and this charge acting through the valve 18 will cause the operation of one of the two relays 20 and 21 to cause the motor 24 to rotate in one direction. If on the other hand the frequency of the impulses from the source 2 is greater than the frequency of the impulses from the source 1, the capacitor 16 will have a resultant charge of the opposite polarity and this charge acting through the valve 18 will cause the operation of the other of the two relays 20 and 21 to cause the motor 24 to rotate in the opposite direction.

The above described apparatus may have various uses where it is desired to produce an indication or to operate a device in one way or in another in response to the frequency relation of the impulses from two sources. One such use is described in my copending application Serial No. 92,416 filed July 24, 1936, for "Apparatus for correcting skew and bow in woven material" where two light beams moving relatively to woven material in directions inclined to the warp elements thereof are intercepted by the weft elements of the material. By photoelectric means the interceptions of each beam are caused to produce a series of impulses and if the material becomes skewed the frequency of one series of impulses will be greater than that of the other. By apparatus like that disclosed herein the resulting operation of one or the other of two relays like relays 20 and 21 or the rotation of a motor like the motor 24 in one direction is indication of such skew. In that application I have disclosed apparatus whereby if the material becomes skewed one way the rotation of the motor in the direction determined by the resulting frequency difference due to that skew effects the correction of the skew. Likewise if the material becomes skewed the other way that skew is corrected by the rotation of the motor in the opposite direction due to that skew.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. Apparatus responsive to the difference in impulse frequency of two series of impulses comprising a main capacitor, a plurality of other capacitors, means for charging said other capacitors, means operative at a frequency responsive to the impulse frequency of each of said series for transferring charges from one of said other capacitors to said main capacitor, the charges received by the main capacitor from one of said other capacitors being of opposite polarity to those received from another of said other capacitors and a device responsive to the resulting charge on said main capacitor.

2. Apparatus responsive to the difference in impulse frequency of two series of impulses comprising a main capacitor, a plurality of like capacitors, means for charging said like capacitors, means operative at a frequency responsive to the impulse frequency of one of said series for transferring charges of one polarity to said main capacitor from one of said like capacitors, means operative at a frequency responsive to the impulse frequency of another of said series for transferring charges of the opposite polarity to said main capacitor from another of said like capacitors and a device responsive to the polarity of the resultant charge on said main capacitor.

3. Apparatus responsive to the difference in impulse frequency of a plurality of series of impulses comprising a main capacitor, two like capacitors, means for charging said like capacitors, means operative in response to each impulse of one of said series for transferring a charge from one of said like capacitors to said main capacitor, means operative in response to each impulse of another of said series for transferring a charge of opopsite polarity from another of said like capacitors to said main capacitor, and apparatus constructed to operate in one sense or in the opposite sense in response to the polarity of the resulting charge on said main capacitor.

4. Apparatus responsive to the difference in impulse frequency of two series of impulses comprising a main capacitor, a plurality of like capacitors, means responsive to each impulse of each series for supplying a charge to one of said like capacitors, means also responsive to each impulse of each series for subsequently transferring a charge from each of the like capacitors to said main capacitor, the polarity of the charge received from one of the like capacitors being opposite to that received from the other and apparatus operative in accordance with the polarity of the resulting charge on the main capacitor.

5. Apparatus responsive to the difference in frequency of two alternating currents comprising a main capacitor, a plurality of like capacitors, means for supplying charges to one of said like capacitors during like half cycles of one of said alternating currents, means for transferring said charges to said main capacitor during the opposite half cycles of said one alternating current, similar means for supplying charges to the other of said like capacitors during like half cycles of the other alternating current and for transferring said charges to said main capacitor whereby they produce thereon a charge of opposite polarity to that supplied by said one capacitor and apparatus operative in one manner or another in accordance with the polarity of the resulting charge on the main capacitor.

6. Apparatus responsive to the difference in frequency of impulses from two sources comprising a capacitor, means for giving said capacitor a charge of one polarity if the frequency of impulses from one source is greater than that from the other and for giving it a charge of the opposite polarity if the frequency of impulses from the one source is less than that from the other and apparatus operative in one sense or in the opposite sense in response to the polarity of the charge on said capacitor.

CRAMER W. LA PIERRE.

CERTIFICATE OF CORRECTION.

Patent No. 2,176,742.                                              October 17, 1939.

CRAMER W. LA PIERRE.

It is hereby certified that error appears in the printed specification of the above numbered patent requiring correction as follows: Page 1, second column, lines 11 and 12, for the words "charge on" read voltage across; page 2, second column, line 50, claim 3, for "a plurality of" read two; line 51, same claim, for "two" read a plurality of; line 58, same claim 3, for "opopsite" read opposite; and that the said Letters Patent should be read with this correction therein that the same may conform to the record of the case in the Patent Office.

Signed and sealed this 19th day of December, A. D. 1939.

(Seal)                                                 Henry Van Arsdale,
                                                                     Acting Commissioner of Patents.